(12) United States Patent
Deleris et al.

(10) Patent No.: US 8,135,502 B2
(45) Date of Patent: Mar. 13, 2012

(54) METHOD AND DEVICE FOR AUTOMATICALLY ADJUSTING AN IMAGE OF AN AIRCRAFT NAVIGATION SCREEN

(75) Inventors: Yannick Deleris, Grenade (FR); Christophe Maily, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 887 days.

(21) Appl. No.: 12/162,475

(22) PCT Filed: Feb. 19, 2007

(86) PCT No.: PCT/FR2007/000291
§ 371 (c)(1),
(2), (4) Date: Jul. 28, 2008

(87) PCT Pub. No.: WO2007/096508
PCT Pub. Date: Aug. 30, 2007

(65) Prior Publication Data
US 2009/0024260 A1    Jan. 22, 2009

(30) Foreign Application Priority Data
Feb. 27, 2006   (FR) .................................... 06 01676

(51) Int. Cl.
*G06G 7/00*  (2006.01)
(52) U.S. Cl. .............................................. 701/14; 701/9

(58) Field of Classification Search ................ 701/1–14, 701/27, 29.1–34.4, 43, 44; 345/472; 353/40; 348/14.07, 333, 346
See application file for complete search history.

(56) References Cited

U.S. PATENT DOCUMENTS

| 2002/0080145 A1 | 6/2002 | Ishihara |
| 2003/0107499 A1 | 6/2003 | Lepere |
| 2004/0059473 A1 | 3/2004 | He |
| 2005/0066275 A1 | 3/2005 | Gannon |
| 2006/0164260 A1 | 7/2006 | Berthou |

FOREIGN PATENT DOCUMENTS

| WO | 02/21229 | 3/2002 |
| WO | 2004/037643 | 5/2004 |

OTHER PUBLICATIONS

International Search Report dated Aug. 2, 2007 w/ English translation.
Written Opinion of the International Searching Authority with English translation.

*Primary Examiner* — Mary Cheung
(74) *Attorney, Agent, or Firm* — Dickinson Wright PLLC

(57) ABSTRACT

A method and device are provided for automatically adjusting an image of an aircraft navigation screen. The device includes a determining unit for automatically determining, if necessary, a new display configuration making it possible to present on a navigation screen a detected dangerous event, and a display unit for automatically effecting a change of display of the navigation screen by applying this new display configuration.

8 Claims, 1 Drawing Sheet

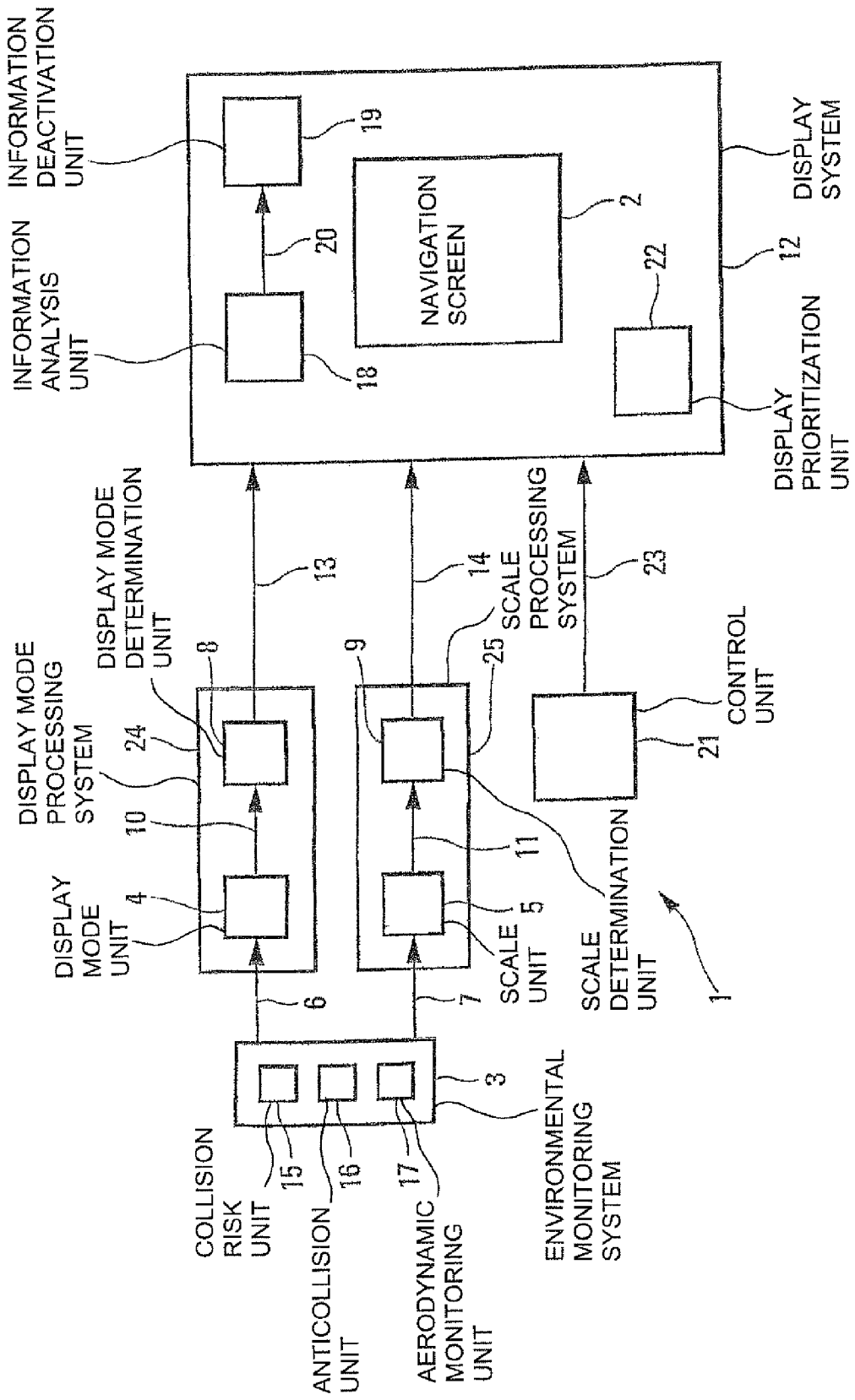

METHOD AND DEVICE FOR AUTOMATICALLY ADJUSTING AN IMAGE OF AN AIRCRAFT NAVIGATION SCREEN

FIELD OF THE INVENTION

The present invention relates to a method and a device for automatically adjusting an image of a navigation screen of an aircraft.

BACKGROUND OF THE INVENTION

It is known that an aircraft, in particular a transport airplane, is generally equipped with various systems intended to monitor the environment of the aircraft (air traffic, terrain overflown, etc.) so as to be able to detect events liable to be dangerous for this aircraft, such as a risk of collision with another aircraft or with the terrain overflown for example. When such a system emits an alert, the pilot of the aircraft generally monitors his navigation screen, for example of ND ("Navigation Display") type, to get an appreciation of the real situation of his aircraft with respect to its environment, in particular in the case of an alert relating to a risk of collision with another aircraft. Now, it may happen that the display configuration existing at this instant on the navigation screen cannot provide the pilot with the sought-after information. Also, to get good sight of the real state of the environment, it is frequently the case that the pilot must, in an often stressing alert situation such as this, modify the display mode and/or the scale of the navigation screen to obtain the appropriate image for managing the current situation. Such manual adjustment may cause him to lose time, in particular in the case where several manipulations on each of the two associated control buttons are necessary. Such a solution is therefore not satisfactory.

SUMMARY OF THE INVENTION

The object of the present invention is to remedy these drawbacks. It relates to a method making it possible to automatically adjust an image of a navigation screen of an aircraft, said navigation screen being capable of displaying an image according to a display mode forming part of a plurality of different display modes and with a scale forming part of a plurality of different scales.

For this purpose, according to the invention, said method is noteworthy in that the following successive operations are carried out, in an automatic manner:
a) a monitoring of the environment of the aircraft is performed so as to be able to detect an event liable to be dangerous for the aircraft; and
b) if such an event is detected in step a):
  b1) the display implemented on the navigation screen is analyzed so as to be able to detect the necessity for a change of display corresponding:
    to a change of display mode; and/or
    to a change of scale;
  b2) if the necessity for a change of display is detected in step b1):
    α) a new display configuration is determined, namely a new display mode and/or a new scale, which is suited to the current environment of the aircraft and which makes it possible to present on the navigation screen the event detected in step a); and
    β) a change of display of the navigation screen is carried out automatically by applying thereto the new display configuration determined in step a).

Thus, by virtue of the invention, upon detection of an event (such as specified below) which is liable to be dangerous for the aircraft, an automatic modification of the display configuration, that is to say of the display mode and/or of the scale, is carried out, if necessary, so as to propose directly to the pilot of the aircraft the display configuration most suited to the situation thereof, in particular that which enables the detected event to be best presented on the navigation screen. This automatic reconfiguration relieves the pilot of a task which has been done manually hitherto, this making it possible in particular to greatly reduce the workload of the pilot in such an alert situation which is usually very stressing.

Furthermore, advantageously, should a dangerous event be detected in step a), the following operations are carried out moreover:
  the set of information presented on the navigation screen is analyzed so as to determine the information which is not indispensable in the short term for the piloting of the aircraft; and
  the display of all the non-indispensable information thus determined is deactivated on said navigation screen.

This makes it possible to simplify the reading of the navigation screen, and therefore to reduce the workload of the pilot, in a high-stress alert situation such as this.

Advantageously, in step a), a monitoring of at least one of the following elements is carried out:
  the air traffic which exists in the aerial environment of the aircraft;
  the terrain overflown by the aircraft; and
  the aerodynamic environment of the aircraft, and in particular the appearance of turbulence.

Additionally, in an advantageous manner, a pilot of the aircraft can request, preferably via a manual control, a change of display of the navigation screen so as to obtain a new display configuration and, when two different changes are requested simultaneously respectively by the pilot and by the operation a), one of the two new display configurations requested is selected automatically in accordance with a predetermined priority logic, and the new display configuration thus selected is applied automatically to the navigation screen.

Within the framework of the present invention, various priority logics are possible, in particular as a function of the display configurations requested and/or as a function of the flight phase. However, in a preferred embodiment, the display configuration requested by the pilot has priority with respect to a display configuration relating to an automatic request. Thus, the pilot of the aircraft remains in charge of the display carried out on the navigation screen, since a simple command on his part makes it possible to override any automatic control in accordance with the invention.

In a particular embodiment, the present invention also relates to a device for automatically adjusting an image of a navigation screen of an aircraft, in particular of a transport airplane, said navigation screen being capable of displaying an image according to a display mode forming part of a plurality of different display modes and with a scale forming part of a plurality of different scales.

According to the invention, said device is noteworthy in that it comprises:
  monitoring means for performing an automatic monitoring of the environment of the aircraft so as to be able to detect an event liable to be dangerous for the aircraft;
  first means for automatically analyzing the display implemented on the navigation screen, if such an event is detected by the monitoring means, so as to be able to detect the necessity for a change of display corresponding:
- to a change of display mode; and/or
- to a change of scale;

second means for automatically determining, if the necessity for a change of display is detected by the first means, a new display configuration, namely a new display mode and/or a new scale, which is suited to the current environment of the aircraft and which makes it possible to present on the navigation screen the detected event; and display means for automatically carrying out a change of display of the navigation screen, by applying the new display configuration determined by said second means.

In a particular embodiment, said device comprises moreover:
- third means for analyzing the set of information presented on the navigation screen, if a dangerous event is detected by the monitoring means, so as to determine the information which is not indispensable in the short term for the piloting of the aircraft; and
- fourth means for deactivating on said navigation screen the display of all the non-indispensable information such as determined by said third means.

Furthermore, in another embodiment, said device comprises moreover:
- actuatable control means, allowing a pilot of the aircraft to request, preferably via a manual control, a change of display of the navigation screen; and
- fifth means for, when two different changes are requested simultaneously respectively by the pilot (via said control means) and by said second means, selecting one of the new display configurations requested, in accordance with a predetermined priority logic, the new display configuration selected by said fifth means being applied automatically to the navigation screen.

BRIEF DESCRIPTION OF THE DRAWINGS

The single FIGURE of the appended drawing will elucidate the manner in which the invention may be carried out. This single FIGURE is the schematic diagram of a device in accordance with the invention.

DETAILED DESCRIPTION OF THE INVENTION

The device 1 in accordance with the invention and schematically represented in the FIGURE is intended to automatically adjust an image of a navigation screen 2 of an aircraft, in particular of a transport airplane.

It is known that a navigation screen 2, for example of ND ("Navigation Display") type, presents a graphical representation of the flight plan of the aircraft and the situation of this aircraft on this flight plan (in two dimensions). Such a navigation screen 2 generally presents the following elements:
- a symbol illustrating the position of the aircraft;
- a plot showing the theoretical flight trajectory of the aircraft in the horizontal flight plan;
- a graduation in angular deviations;
- a graduation in distance; and
- possibly one or more auxiliary plots illustrating for example a radar image and/or an image of the terrain overflown.

In a standard manner, said navigation screen 2 is capable of displaying an image according to a particular display mode and according to a particular scale. This particular display mode and this particular scale form part, respectively, of a plurality of different display modes and of a plurality of different scales, as specified below.

According to the invention, said device 1 comprises:
- monitoring means 3 specified below, for performing an automatic monitoring of the environment of the aircraft so as to be able to detect any event liable to be dangerous for said aircraft, such as a risk of collision with the terrain overflown or with another aircraft for example;
- means 4 and 5 for automatically analyzing the display implemented on the navigation screen 2, when a dangerous event is detected by the monitoring means 3, to which they are connected respectively by way of links 6 and 7. These means 4 and 5 are formed so as to be able to detect the necessity for a change of display corresponding, respectively, to a change of display mode (as regards said means 4) and to a change of scale (as regards the means 5);
- means 8 and 9 which are connected, respectively by way of links 10 and 11, to said means 4 and 5 and which are formed so as to automatically determine a new display configuration, when the necessity for a change of display is detected by the means 4 and 5. More precisely, when the means 4 detect the necessity for a change of display mode, the means 8 determine a new display mode which is suited to the current environment of the aircraft and which makes it possible to present on the navigation screen 2 the detected event. Moreover, when the means 5 detect the necessity for a change of scale, the means 9 automatically determine a new scale which is also suited to the current environment of the aircraft and which also makes it possible to present on the navigation screen 2 the detected event; and
- display means 12 which are connected, respectively by way of links 13 and 14, to said means 8 and 9 and which are formed so as to automatically carry out a change of display of the navigation screen 2. Accordingly, said display means 12 apply the new display mode received from said means 8 and/or the new scale received from said means 9 so as to obtain the new display configuration.

Thus, upon detection of an event (such as specified below) which is liable to be dangerous for the aircraft, the device 1 carries out, if necessary, an automatic modification of the display configuration (that is to say of the display mode alone, or of the scale alone, or else of both the display mode and the scale) of the navigation screen 2, so as to propose directly to the pilot of the aircraft the display configuration most suited to the situation thereof, in particular that which enables the detected event to be best presented on the navigation screen 2. This automatic reconfiguration relieves the pilot of a task which is customarily carried out in a manual manner, which in particular makes it possible to reduce the workload of the pilot in such an alert situation which is usually very stressing.

In a preferred embodiment, said monitoring means 3 comprise:
- a system 15 for detecting a risk of collision of the aircraft with the terrain overflown; and/or
- an anticollision system 16; and/or
- a system 17 for monitoring the aerodynamic environment of the aircraft, in particular making it possible to detect wind shears.

The object of said system 15 is to detect any risk of collision of the aircraft on which it is mounted, with the surrounding terrain, and to alert the crew of this aircraft when such a risk is detected. Concerning this system 15, it may in particular be a system of TAWS ("Terrain Awareness and Warning System") type, in particular of EGPWS ("Enhanced Ground Proximity Warning System") type or of GCAS ("Ground Collision Avoidance System") type. When such a system 15 emits an alert signal, it is generally up to the pilot to implement everything, in particular by piloting the aircraft manually, to avoid a collision with the terrain.

Furthermore, the anticollision system 16, in particular of TCAS ("Traffic alert and Collision Avoidance System") type, makes it possible to monitor the trajectories of the aircraft flying in proximity to the aircraft considered and to represent their respective positions on a viewing screen, for example the navigation screen 2. This anticollision system 16 relies on an exchange of information by way of transponders. With the aid of the altitude and distance, exchanged for example every second, said anticollision system 16 calculates the trajectory of any intruder aircraft. It then estimates the potential danger and calculates an appropriate maneuver to avoid it. This maneuver is generally executed solely in the vertical plane.

Additionally, the system 17, for example of PWS ("Predictive Windshear") type, makes it possible to detect low-altitude turbulent meteorological events, called wind shears. The detection of these phenomena is done, for example, with the aid of an X-band weather radar using the principle of the Doppler effect.

As indicated previously, the device 1 in accordance with the invention makes it possible to automatically adjust the display configuration on the navigation screen 2, upon the emission of an alert by at least one of said systems 15, 16 and 17. This adjustment of the display configuration is characterized by an automatic adaptation of the scale (generally expressed in nautical miles) and/or of the display mode.

Concerning the display modes, it is known that a navigation screen 2 generally comprises at least the following modes:
  a mode termed "Rose", for which a symbol illustrating the aircraft is situated at the center of the navigation screen 2. It is fixed and has the nose pointing upwards. Several concentric circles give a reference scale making it possible to measure distances rapidly and visually;
  a mode termed "Arc", for which the symbol illustrating the aircraft is situated at the bottom of the navigation screen 2, at the center of several circular arcs, whose separation corresponds to the zoom level selected. The map rotates and slides as a function of the movements of the aircraft, whose symbol remains fixed, as in the "Rose" mode; and
  a mode termed "Plan". This is a view from above, pointing towards North. The aircraft moves on this map, which is fixed. The "Plan" mode resembles that of the "Rose" mode (it consists of circles), but it is somewhat scantier and detached from the symbol representing the aircraft.

Additionally, in a particular embodiment, the device 1 comprises moreover:
  means 18 for analyzing the set of information presented on the navigation screen 2, when a dangerous event is detected by the monitoring means 3, so as to determine the information which is not indispensable in the short term for the piloting of the aircraft; and
  means 19 which are connected by way of a link 20 to said means 18 and which are formed so as to deactivate in this situation, on said navigation screen 2, the display of all the non-indispensable information determined by said means 18.

This particular embodiment makes it possible to simplify the reading of the navigation screen 2, and thus to reduce the workload of the pilot, in a high-stress alert situation such as this.

Furthermore, in a preferred embodiment, said device 1 comprises moreover:

actuatable control means 21 allowing a pilot of the aircraft to request a change of display mode of the navigation screen 2. These control means 21 are formed so as to be able to be controlled in a manual manner, by way of a rotary button or of an actuatable key; and
  means 22 for managing the priorities, which are for example integrated into said display means 12. These means 22 are formed so as to select one of the new display configurations requested, when two different changes of display are requested simultaneously, respectively, following the actuation of the control means 21 by the pilot (via a link 23) and automatically by said means 8 or 9 (via the link 13 or 14). Said means 22 carry out this selection in accordance with a predetermined priority logic.

The new display configuration selected by these means 22 is automatically applied to the navigation screen 2, by said display means 12.

Within the framework of the present invention, various priority logics are possible, in particular as a function of the display configurations requested and/or as a function of the flight phase. However, in a preferred embodiment, a request made by the pilot always has priority with respect to any automatic request. Thus, the pilot of the aircraft remains in charge of the display performed on the navigation screen 2, since a simple command on his part (with the aid of said control means 21) makes it possible to override any automatic control in accordance with the invention.

In a particular embodiment:
  said means 4 and 8 are integrated into a processing unit 24; and
  said means 5 and 9 are integrated into a processing unit 25.

It will be noted, by way of illustration, that in the case of a collision alert emitted by the anticollision system 16:
  the processing unit 24 checks, by taking account for example of the angular position of the intruder aircraft detected with respect to the magnetic heading of the aircraft on which the device 1 is mounted, whether this intruder aircraft is contained in the image which is displayed on the navigation screen 2 and which complies with the current display mode. If such is not the case, the processing unit 24 determines a display mode, for which the angular position of the intruder aircraft can be displayed on the navigation screen 2; and
  the processing unit 25 checks, by taking account of the current scale of the navigation screen 2, and of the distance between the aircraft equipped with the device 1 and the intruder aircraft, whether the intruder aircraft is situated on the image displayed by the navigation screen 2. If such is not the case, the processing unit 25 selects a scale making it possible to represent this intruder aircraft on the image displayed. Such a selection is carried out for example in an iterative manner, by making the aforesaid check stepwise in accordance with the possible scale values which are taken into account successively according to an order of increasing value.

The invention claimed is:
1. A method for automatically adjusting an image of a navigation screen of an aircraft, said navigation screen displaying an image having at least one display mode and at least one scale, the method comprising the steps of:
  a) monitoring aircraft environment to detect a potentially dangerous environmental event for the aircraft;
  b) analyzing, upon detection of the potentially dangerous environmental event, the displayed image for a change of display mode and a change of scale;

c) determining a new display mode and a new scale suited to the detected potentially dangerous environmental event;
d) changing display of the navigation screen by applying the newly determined display mode and scale;
e) analyzing information presented on the navigation screen, upon detection of the potentially dangerous environmental event, to determine dispensable, short term piloting information; and
f) deactivating the determined dispensable, short term piloting information from the navigation screen.

2. The method as claimed in claim 1, wherein in step a), monitoring of at least one of the following elements is carried out:
air traffic which exists in an aerial environment of the aircraft;
terrain overflown by the aircraft; and
aerodynamic environment of the aircraft.

3. The method as claimed in claim 1, wherein a pilot of the aircraft can request a change of display of the navigation screen so as to obtain a new display configuration and, when two different changes are requested simultaneously respectively by the pilot and by the operation $\alpha$), one of the two new display configurations requested is selected automatically in accordance with a predetermined priority logic, and the new display configuration thus selected is applied automatically to the navigation screen.

4. A device for automatically adjusting an image of a navigation screen of an aircraft, said navigation screen displaying an image having at least one display mode and at least one scale, said device comprising:
environmental monitoring unit that monitors aircraft environment to detect a potentially dangerous environmental event for the aircraft;
a display mode analysis unit and a scale analysis unit that analyze, upon detection of the potentially dangerous environmental event by the environment monitoring unit, the displayed image for a change of display mode and a change of scale;
a display mode determination unit and a scale determination unit that determine from the analysis of the display mode analysis unit and the scale analysis unit, a new display mode and a new scale suited to the detected potentially dangerous environmental event;
display system that changes display of the navigation screen, by applying the newly determined display mode and scale;
information analysis unit that analyzes information presented on the navigation screen, upon detection of the potentially dangerous environmental event, to determine dispensable, short term piloting information; and
information deactivation unit that deactivates the determined dispensable, short term piloting information from the navigation screen.

5. The device as claimed in claim 4, further comprising:
actuatable control unit that allows a pilot of the aircraft to request a change of display of the navigation screen; and
display prioritization unit that selects, when two different changes are requested simultaneously by the pilot and by the at least one of a display mode determination unit and a scale determination unit, a new display configuration, in accordance with a predetermined priority logic, the new display configuration being applied automatically to the navigation screen.

6. The device of claim 4, wherein the a display mode analysis unit and the display mode determination unit are integrated into a display mode processing unit, and wherein the display mode processing unit:
checks an angular position of a detected aircraft intruder with respect to a magnetic heading of the aircraft on which the device is mounted;
checks the navigation screen for display of the detected aircraft intruder on the navigation screen; and
determines a display mode for the angular position of the detected aircraft intruder on the navigation screen.

7. The device of claim 6, wherein the scale analysis unit and the scale determination unit are integrated into a scale processing unit, and wherein the scale processing unit:
checks distance between a detected aircraft intruder and the aircraft on which the device is mounted;
checks the navigation screen for display of the detected aircraft intruder on the navigation screen; and
determines a scale that presents an image of the detected aircraft intruder on the navigation screen.

8. An aircraft, comprising:
a navigation screen that displays an image having at least one display mode and at least one scale; and
a device that adjusts the image of the navigation screen, wherein the device comprises:
environmental monitoring unit that monitors aircraft environment to detect a potentially dangerous environmental event for the aircraft,
a display mode analysis unit and a scale analysis unit that analyze, upon detection of the potentially dangerous environmental event by the environment monitoring unit, the displayed image for a change of display mode and a change of scale,
a display mode determination unit and a scale determination unit that determine from the analysis of the display mode analysis unit and the scale analysis unit, a new display mode and a new scale suited to the detected potentially dangerous environmental event,
display system that changes display of the navigation screen by applying the newly determined display mode and scale,
information analysis unit that analyzes information presented on the navigation screen, upon detection of the potentially dangerous environmental event, to determine dispensable, short term piloting information, and
information deactivation unit that deactivates the determined dispensable, short term piloting information from the navigation screen.

* * * * *